(12) United States Patent
Kakui

(10) Patent No.: US 7,864,410 B2
(45) Date of Patent: Jan. 4, 2011

(54) OPTICAL ACTIVE DEVICE HAVING OPTICAL AMPLIFYING SECTIONS CASCADED ON A PATH FOR PROPAGATING INPUT LIGHT WITH A PREDETERMINED WAVELENGTH

(75) Inventor: Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 777 days.

(21) Appl. No.: 11/798,530

(22) Filed: May 15, 2007

(65) Prior Publication Data
US 2007/0268570 A1    Nov. 22, 2007

(30) Foreign Application Priority Data
May 16, 2006    (JP) ............................ P2006-136622

(51) Int. Cl.
*H04B 10/17*    (2006.01)
*H04B 10/12*    (2006.01)

(52) U.S. Cl. .............................. 359/337.2; 359/341.32; 359/341.5

(58) Field of Classification Search .............. 359/337.2, 359/341.32, 341.5
See application file for complete search history.

(56) References Cited

U.S. PATENT DOCUMENTS

| | | | | |
|---|---|---|---|---|
| 4,938,556 A | * | 7/1990 | Digonnet et al. | 359/341.31 |
| 5,280,549 A | * | 1/1994 | Barnard et al. | 385/15 |
| 5,867,305 A | * | 2/1999 | Waarts et al. | 359/337.12 |
| 5,930,030 A | * | 7/1999 | Scifres | 359/341.3 |
| 5,933,271 A | * | 8/1999 | Waarts et al. | 359/341.31 |
| 6,081,369 A | * | 6/2000 | Waarts et al. | 359/341.33 |
| 6,359,728 B1 | * | 3/2002 | Angellieri et al. | 398/92 |
| 6,384,948 B1 | * | 5/2002 | Williams et al. | 398/202 |
| 6,917,631 B2 | * | 7/2005 | Richardson et al. | 372/5 |
| 2004/0196537 A1 | * | 10/2004 | Starodoumov | 359/341.3 |
| 2007/0041083 A1 | * | 2/2007 | Di Teodoro et al. | 359/333 |

* cited by examiner

*Primary Examiner*—Eric Bolda
(74) *Attorney, Agent, or Firm*—McDermott Will & Emery LLP (57) ABSTRACT

The present invention relates to an optically active device comprising a plurality of stages of optical amplifying sections cascaded on an input light propagation path, and a structure for effectively preventing an upstream pumping light source from being destroyed by ASE light propagating in a direction opposite to the input light. The optically active device comprises, at least, a front-stage optical amplifying section and a rear-stage optical amplifying section which are adjacent to each other on the input light propagation path. Each of the front-stage optical amplifying section and rear-stage optical amplifying section includes an amplification fiber doped with ytterbium as an optically active material and a pumping light source for supplying the amplification optical fiber with pumping light in the band of 0.98 μm for pumping the optically active material. In particular, the optically active device comprises a deterioration preventing structure for preventing the pumping light source in the front-stage optical amplifying section from deteriorating a performance. An embodiment of the deterioration preventing structure is realized by a wavelength-multiplexing fiber coupler of a wavelength division type arranged between the front-stage optical amplifying section and rear-stage optical amplifying section. The wavelength-multiplexing coupler has a port for selectively eliminating from the input light propagation path at least an ASE component in the band of 0.98 μm from backward ASE light from the rear-stage optical amplifying section.

6 Claims, 8 Drawing Sheets

| SAMPLE | UNSATURATED ABSORPTION PEAK (dB/m) | CORE DIAMETER (μm) | CLADDING DIAMETER (μm) | PUMPING POWER (W) | LENGTH (m) |
|---|---|---|---|---|---|
| YbDF41 | 250 | 2.4 | 125 | 0.2 | 5 |
| YbDF42 | 180 | 4.0 | 125 | 0.2 | 3 |
| YbDF43 | 9 | 15.0 | 125 | 17.8 | 9 |

OPTICAL ACTIVE DEVICE HAVING OPTICAL AMPLIFYING SECTIONS CASCADED ON A PATH FOR PROPAGATING INPUT LIGHT WITH A PREDETERMINED WAVELENGTH

BACKGROUND OF THE INVENTION

1. Field of the Invention

The present invention relates to an optically active device which comprises an amplification optical fiber doped with an optically active material.

2. Related Background Art

Examples of optically active devices which comprise amplification optical fibers doped with optically active materials include fiber laser light sources and optical fiber amplifiers, which have been widespread in various uses such as processing in electronic/mechanical fields, medicine, measurement, and optical communications. In uses requiring high-power laser light such as laser processing in particular, unnecessary energy becomes heat by the photon energy difference between pumping light and output laser light. From the viewpoint of lowering this thermal energy, it has been desired that the pumping light and output laser light have respective wavelengths close to each other. Therefore, the use of ytterbium (Yb), which is one of rare-earth elements, as an optically active material added to amplification optical fibers has been increasing.

Figure 3:
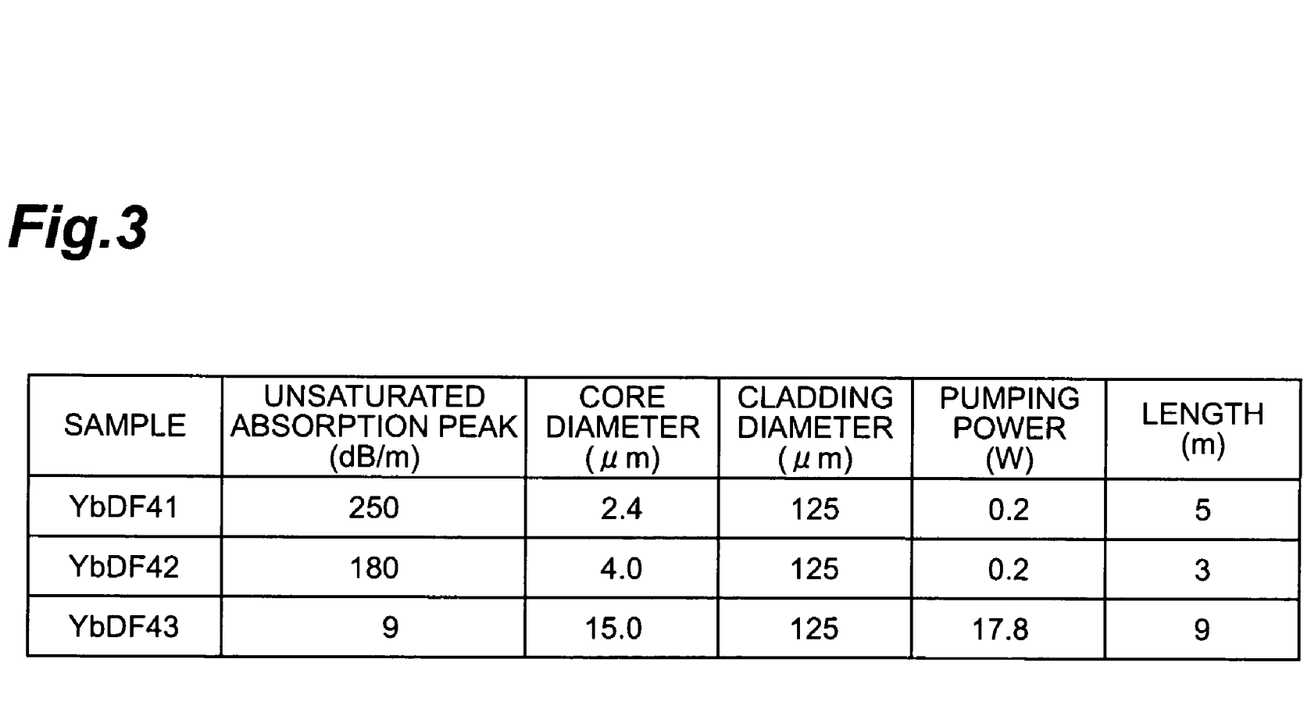
FIG. 3 is a table listing properties of various samples (YbDF 41 to 43) of amplification optical fibers employable in the optically active device according to the first embodiment.
Figure 8:
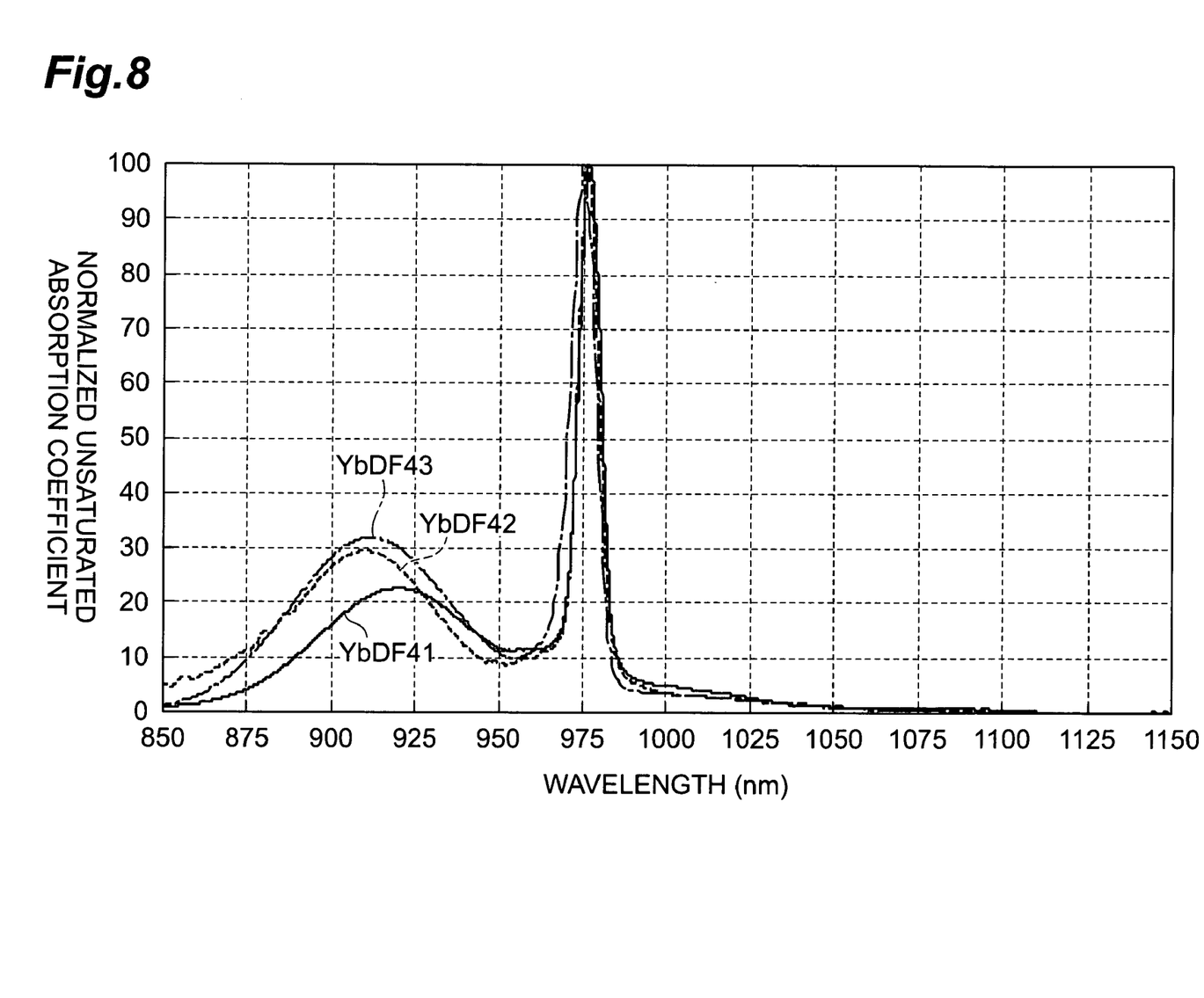
FIG. 8 is a graph showing the wavelength dependency of normalized unsaturated absorption coefficient concerning various samples of Yb-doped fiber (YbDF 41 to 43).

As shown in FIG. 8, a Yb-doped fiber (YbDF) usually has an output laser light wavelength in the wavelength region of 1030 nm to 1100 nm where Yb ions have a gain because of absorption and induced emission characteristics of Yb. On the other hand, the band of 0.92 µm (0.92 to 0.93 µm) and the band of 0.98 µm (0.97 to 0.98 µm) have typically been in use as the pumping light wavelength. From the above-mentioned viewpoint of making the respective wavelengths of output laser light and pumping light closer to each other, the band of 0.98 µm is desirable as the pumping light wavelength in particular. FIG. 8 is a graph showing the wavelength dependency of normalized unsaturated absorption coefficient concerning various samples of Yb-doped fiber (YbDF 41 to 43). The samples YbDF 41 to 43 have various characteristics as shown in FIG. 3. Namely, the sample YbDF 41 has an unsaturated absorption peak of 250 dB/m, a core diameter of 2.4 µm, and a cladding diameter of 125 µm. The sample YbDF 42 has an unsaturated absorption peak of 180 dB/m, a core diameter of 4.0 µm, and a cladding diameter of 125 µm. The sample YbDF 43 has a double cladding structure with an unsaturated absorption peak of 9 dB/m, a core diameter of 15.0 µm, and an inner cladding diameter of 125 µm.

However, a multimode-pumping laser diode (LD) is used as a pumping light source in the cladding pumping scheme often employed in uses requiring high-power laser light. In this case, the pumping power reaches several watts, whereby the temperature of an LD chip is hard to adjust. As a result, there is a possibility of the pumping light wavelength changing because of fluctuations in temperature of the LD chip. In the absorption spectrum of Yb, the band of 0.98 µm has a sharp peak, whereby the pumping light wavelength may deviate from this absorption peak depending on changes therein. This means the occurrence of a state where the pumping light is hardly absorbed by Yb but is transmitted through the Yb-doped optical fiber (YbDF). From such a viewpoint, it is desirable that the band of 0.92 µm be used as the pumping light wavelength in cladding pumping.

In the core pumping scheme employing a single-mode pumping LD, on the other hand, it is hard to neglect the present state where 0.98-µm-band-pumping LD modules incorporating temperature-adjusting devices are widely available in the market for communications so that there is no obstacle for pumping in the band of 0.98 µm.

SUMMARY OF THE INVENTION

The present inventors have examined the above prior art, and as a result, have discovered the following problems. That is, when the pumping light wavelength and output laser light wavelength are close to each other as in Yb pumping, the occurrence of an ASE component having the same wavelength as the pumping light wavelength becomes remarkable within the YbDF. In this case, there is a risk of the pumping light source itself being destroyed by the ASE component generated on the downstream side of a signal propagation path returning to the pumping light source positioned on the upstream side.

The present invention has been developed to eliminate the problems described above. It is an object of the present invention to provide an optically active device having a structure for effectively preventing a pumping light source on the upstream side from being destroyed by the backward propagation of the ASE component having the same wavelength as the pumping light wavelength generated on the downstream side in the multistage amplification of input light in the propagation path thereof.

The optically active device according to the present invention comprises a plurality of optical amplifying sections cascaded on a path for propagating input light having a predetermined wavelength. Specifically, the optically active device comprises a front-stage optical amplifying section, positioned on the upstream side as seen in a propagating direction of input light in optical amplifying sections adjacent to each other selected from the plurality of optical amplifying sections, a rear-stage optical amplifying section positioned on the downstream side as seen in the propagating direction of input light in the optical amplifying sections adjacent to each other, and a deterioration preventing structure for preventing the front-stage pumping light source constituting a part of the optical amplifying sections from deteriorating a performance.

The front-stage optical amplifying section includes, at least, a front-stage amplification optical fiber and a front-stage pumping light source. The front-stage amplification optical fiber is doped with ytterbium as an optically active material. By way of a multiplexer, the front-stage pumping light source supplies the front-stage amplification optical fiber with pumping light for pumping ytterbium, which is pumping light containing at least a wavelength component in the band of 0.98 µm. On the other hand, the rear-stage optical amplifying section includes, at least, a rear-stage amplification optical fiber doped with ytterbium as an optically active material and a rear-stage pumping light source, whereas the rear-stage pumping light source supplies the rear-stage amplification optical fiber with pumping light for pumping ytterbium by way of a multiplexer.

In particular, the deterioration preventing structure in the optically active device according to the present invention includes any of a structure preventing, in the backward ASE (Amplified Spontaneous Emission) light generated in the rear-stage amplification optical fiber and directed from the rear-stage optical amplifying section to the front-stage optical amplifying section, the ASE component in the band of 0.98 µm (i.e., the ASE component having the same wavelength as the pumping light outputted from the front-stage pumping light source) from being directly incident on the front-stage pumping light source by way of the multiplexer in the front-stage optical amplifying section and a structure attenuating the power of the ASE component in the band of 0.98 μm until the power is lower than a level uninfluential to the deterioration in a performance of the front-stage pumping light source before the backward ASE light is incident on the multiplexer in the front-stage optical amplifying section.

In the optically active device according to the present invention, the front-stage amplification optical fiber may include at least one amplification optical fiber cascaded onto a path propagating the input light.

The optically active device according to the present invention has a structure for amplifying the light to be amplified fed into the rear-stage optical amplifying section in the front-stage optical amplifying section beforehand in order to obtain high-power laser light from the rear-stage optical amplifying section. In the rear-stage optical amplifying section, the pumping light from the rear-stage pumping light source is fed into the rear-stage amplification optical fiber containing an optically active material (Yb), whereby the optically active material is pumped. At this time, the light to be amplified is fed into the rear-stage amplification optical fiber and thus is amplified. Also, wideband ASE light is generated within the rear-stage amplification optical fiber. Even when the pumping light wavelength is included in the wavelength region of this ASE light, the ASE component having the same wavelength as that of the pumping light is kept from returning to the front-stage pumping light source within the front-stage optical amplifying section by the deterioration preventing structure or its power is fully lowered thereby, which prevents the front-stage pumping light source from being destroyed.

In the optically active device according to the present invention, ytterbium (Yb) is employed as the optically active material added to each of the amplification optical fibers in the front- and rear-stage optical amplifying sections. The optically active material is pumped with pumping light containing a pumping light component in the band of 0.98 μm at least in the front-stage optical amplifying section. The amplification optical fiber doped with Yb as the optically active material generates high-power ASE light, while the pumping light wavelength is included in the wavelength region of the ASE light. Therefore, if the ASE light generated in the rear-stage optical amplifying section returns to the front-stage optical amplifying section positioned on the upstream side, there will be a high risk of the front-stage pumping light source included in the front-stage optical amplifying section being destroyed. However, this optically active device is provided with the deterioration preventing structure for preventing or restraining the backward ASE light from returning to the front-stage pumping light source, whereby the front-stage pumping light source is kept from being destroyed.

Preferably, in the optically active device according to the present invention, the deterioration preventing structure includes a wavelength-multiplexing fiber coupler of a wavelength division type provided between the front-stage optical amplifying section and the rear-stage optical amplifying section. This wavelength-multiplexing fiber coupler has, at least, a first port optically connected to a light entrance end of the rear-stage optical amplifying section, a second port which is optically connected to a light exit end of the front-stage optical amplifying section and transmits therethrough an ASE component in a wavelength band excluding the pumping light wavelength in the backward ASE light inputted through the first port, and a third port for selectively outputting an ASE component having the same wavelength as the pumping light wavelength in the backward ASE light inputted through the first port. In this case, the wavelength-multiplexing fiber coupler as the deterioration preventing structure yields a low insertion loss, and is also advantageous in terms of safety.

Preferably, in the optically active device according to the present invention, an end part of the third port in the wavelength-multiplexing fiber coupler is terminated without reflection while having a heat-dissipating mechanism. This structure is suitable for eliminating stray light.

Preferably, the rear-stage amplification optical fiber included in the rear-stage optical amplifying section in the optically active device according to the present invention has a double cladding structure for realizing cladding pumping. At this time, it will be preferred if the rear-stage pumping light source included in the rear-stage optical amplifying section outputs pumping light in a single transverse mode. The pumping light in the single transverse mode outputted from the rear-stage pumping light source propagates through the cladding of the rear-stage amplification optical fiber, thereby pumping the optically active material.

In the optically active device according to the present invention, the deterioration preventing mechanism may provide the backward ASE light (ASE component having at least the same wavelength as the pumping wavelength) with a transmission loss equal to or lower than that of means for coupling the pumping light outputted from the front-stage pumping light source with the front-stage amplification optical fiber. Such a structure can also effectively lower the incidence level of the unnecessary ASE component reaching the front-stage pumping light source.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2A shows a cross-sectional structure of an amplification optical fiber employed in a rear-stage optical amplifier in the optically active device according to the first embodiment, whereas

DETAILED DESCRIPTION OF THE PREFERRED EMBODIMENTS

In the following, embodiments of the optically active device according to the present invention will be explained in detail with reference to FIGS. 1, 2A, 2B, 3, 4, 5A, 5B, and 6 to 8. In the explanation of the drawings, the same constituents and the same parts will be referred to with the same numerals while omitting their overlapping descriptions.

First Embodiment

Figure 1:
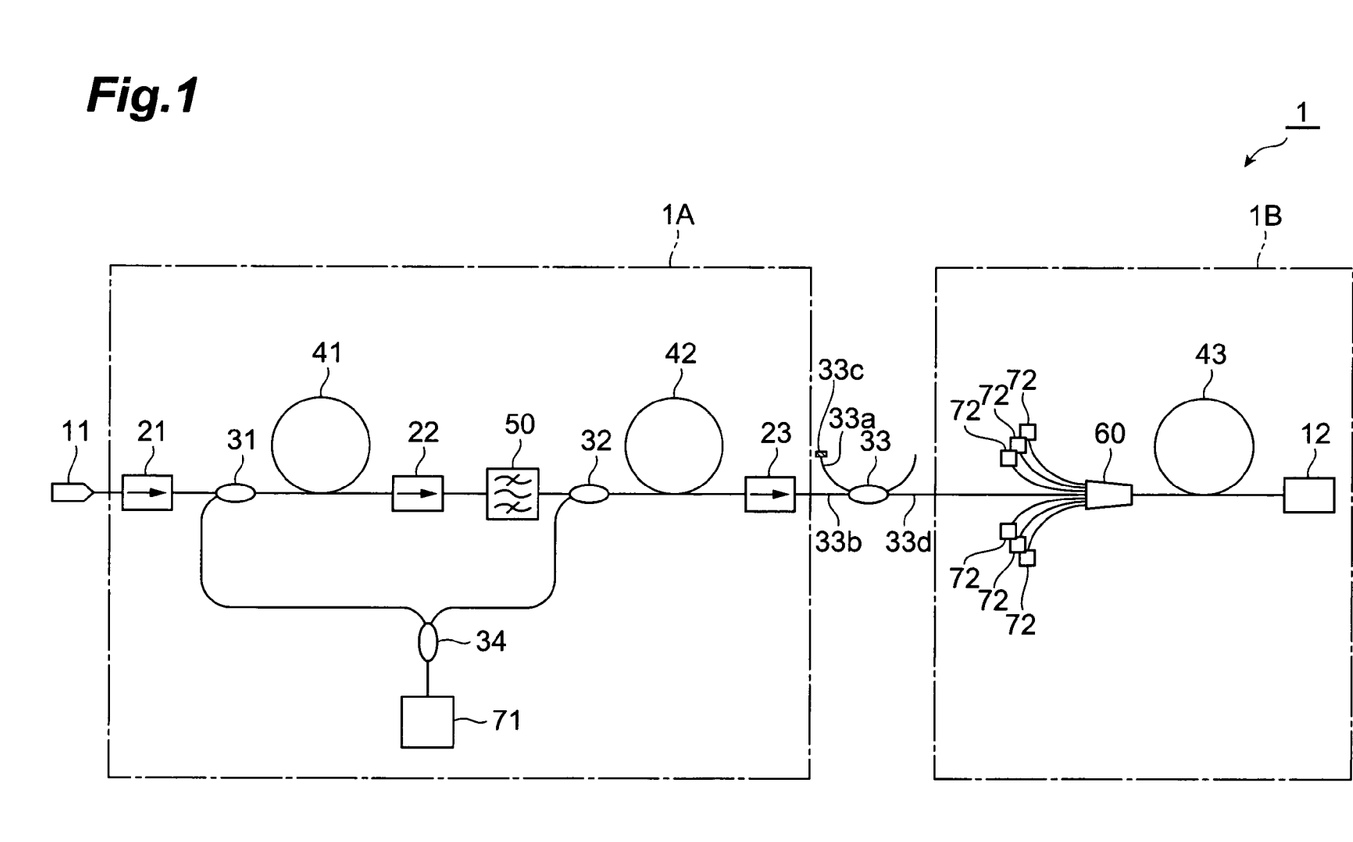
FIG. 1 is a view showing the structure of a first embodiment of the optically active device according to the present invention.

To begin with, a first embodiment of the optically active device according to the present invention will be explained. FIG. 1 is a view showing the structure of the first embodiment of the optically active device according to the present invention. The optically active device 1 according to the first embodiment shown in FIG. 1 is an optical amplifier which amplifies light fed to an input connector 11 and outputs collimated light obtained by collimating the amplified light with an output collimator 12. In particular, the optically active device 1 comprises a front-stage optical amplifying section 1A and a rear-stage optical amplifying section 1B which are successively arranged along a propagating direction of the input light directed from the input connector 11 to the output collimator 12. The front-stage optical amplifying section 1A includes an optical isolator 21, an optical coupler 31, a YbDF 41, an optical isolator 22, a bandpass filter 50, an optical coupler 32, a YbDF 42, and an optical isolator 23 which are successively arranged along the propagating direction of input light, while the rear-stage optical amplifying section 1B includes a combiner 60 and a YbDF 43. An optical coupler 33 is arranged between the front-stage optical amplifying section 1A and the rear-stage optical amplifying section 1B. The front-stage optical amplifying section 1A further includes an optical coupler 34 and a front-stage pumping light source 71 which are optically connected to the optical couplers 31, 32. On the other hand, the rear-stage optical amplifying section 1B includes a plurality of rear-stage pumping light sources 72 optically connected to the combiner 60.

Figure 2A:
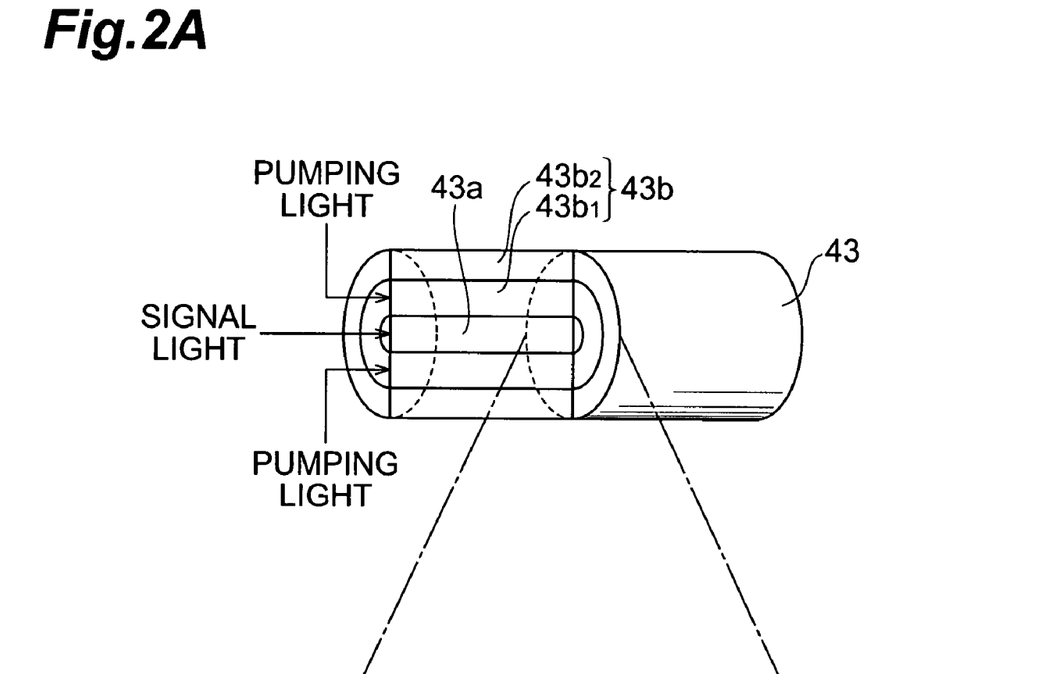
Figure 2B:
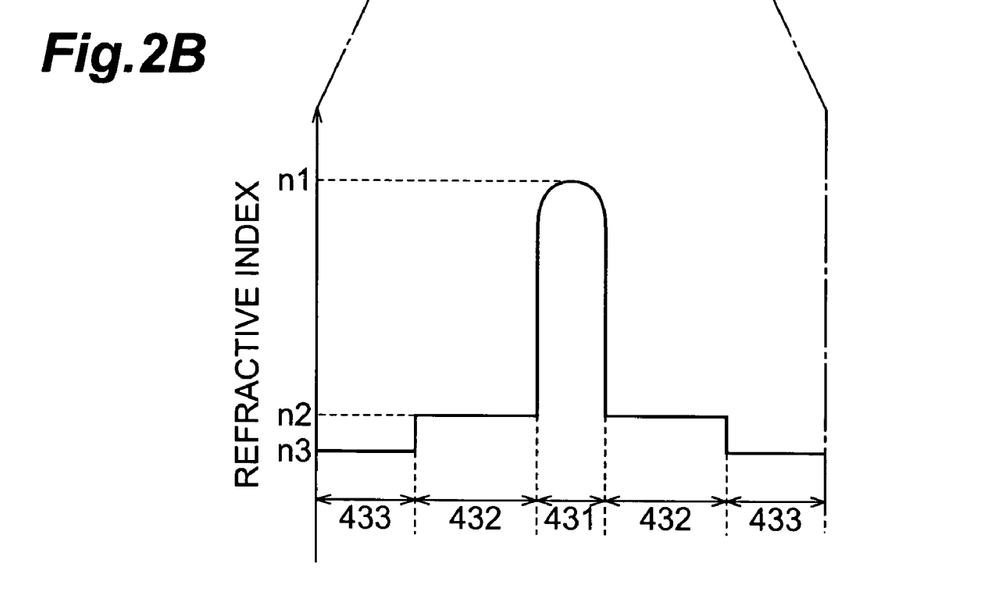
FIG. 2B is a refractive index profile of this amplification optical fiber.

Each of the YbDFs 41 to 43 is an amplification optical fiber containing silica glass as its host glass, in which an optical waveguide region is doped with elementary Yb as an optically active material. In particular, the YbDF 43 contained in the rear-stage optical amplifying section 1B comprises a core 43a (having a maximum refractive index n1) which is doped with elementary Yb and propagates light to be amplified, and a cladding region 43b surrounding the core 43a as shown in FIG. 2A. The cladding region 43b is constituted by an inner cladding 43b1 (having a refractive index n2 (<n1)) which propagates pumping light components from the plurality of pumping light sources 72, and an outer cladding 43b2 (having a refractive index n3 (<n2)) surrounding the inner cladding 43b1. The front-stage pumping light source 71 is a single-mode pumping LD which outputs pumping light (in the wavelength band of 975 nm) to be supplied to the YbDFs 41, 42. On the other hand, the plurality of rear-stage pumping light sources 72 are multimode pumping LDs which output pumping light (in the wavelength band of 915 nm) to be supplied to the YbDF 43. Each of the YbDFs 41 to 43 amplifies light in the wavelength band of 1064 nm. FIG. 2B shows a refractive index profile 430 of the YbDF 43, in which areas 431, 432, 433 indicate respective refractive indexes of parts in the diagonal direction of the core 43a, inner cladding 43b1, and outer cladding 43b2.

Each of the optical isolators 21 to 23 transmits light therethrough forward from the input connector 11 to the output collimator 12. The optical coupler 34 divides the pumping light outputted from the front-stage pumping light source 71 into two so that they are fed to the optical couplers 31, 32, respectively. The optical coupler 31 outputs the pumping light arriving from the optical coupler 34 to the YbDF 41, and light (light to be amplified) arriving from the optical isolator 21 to the YbDF 41. The optical coupler 32 outputs the pumping light arriving from the optical coupler 34 to the YbDF 42, and light (light to be amplified) arriving from the optical isolator 21 to the YbDF 42.

The optical coupler 33 is a wavelength-multiplexing fiber coupler and is provided between the front-stage pumping light source 71 and amplification optical fiber 43 as a deterioration preventing structure for preventing deteriorations in performances of the front-stage pumping light source 71 (e.g., destruction of the front-stage pumping light source 71) from occurring. The optical coupler 33 has a first port 33d optically connected to a light entrance end of the combiner 60 (the light entrance end of the rear-stage optical amplifying section 1B), a second port 33b optically connected to the light output end of the optical isolator 23 (the light output end of the front-stage optical amplifying section 1A), and a third port 33a (ASE transmission output port) which selectively outputs an ASE component having the same wavelength as the pumping light wavelength (in the wavelength band of 975 nm) from the wideband ASE light inputted from the combiner 60 through the first port 33d. Namely, the optical coupler 33 outputs the light arriving from the optical isolator 23 through the second port 33b to the combiner 60 through the first port 33d, and the ASE component having the same wavelength as the pumping light wavelength (in the wavelength band of 975 nm) from the wideband ASE light inputted from the combiner 60 through the first port 33d to the ASE transmission output port 33a. The combiner 60 outputs the light arriving from the optical coupler 33 through the first port 33d to the YbDF 43, and the pumping light (in the wavelength band of 915 nm) arriving from the plurality of rear-stage pumping light sources 72 to the YbDF 43. The bandpass filter 50 selectively transmits therethrough the wavelength to be amplified in the light arriving from the optical isolator 22 and outputs it to the optical coupler 32.

The optically active device 1 according to the first embodiment operates as follows. The pumping light (in the wavelength band of 975 nm) outputted from the front-stage pumping light source 71 is divided into two, which are outputted from the optical coupler 34 to the optical couplers 31, 32, respectively. The pumping light inputted to the optical coupler 31 is supplied forward to the YbDF 41. The pumping light inputted to the optical coupler 32 is supplied forward to the YbDF 42. The pumping light (in the wavelength band of 915 nm) outputted from the plurality of rear-stage pumping light sources 72 is supplied forward to the YbDF 43 through the combiner 60.

The light inputted from the input connector 11 is fed into the YbDF 41 through the optical isolator 21 and optical coupler 31, and is amplified in the YbDF 41. The first-order amplified light outputted from the YbDF 41 is fed into the YbDF 42 through the optical isolator 22, bandpass filter 50, and optical coupler 32, and is amplified in the YbDF 42 as well. The second-order amplified light outputted from the YbDF 42 is fed into the YbDF 43 through the optical isolator 23, optical coupler 33, and combiner 60, and is further amplified in the YbDF 43. The final amplified light outputted from the YbDF 43 is outputted as collimated light by the output collimator 12 to the outside of the optically active device 1.

Namely, the optically active device 1 according to the first embodiment causes the YbDFs 41 to 43 to successively amplify the light fed to the input connector 11, and outputs the resulting amplified light as collimated light from the output collimator 12 to the outside of the optically active device 1. For example, a pulse-modulated YAG laser, LD, or the like is connected to the input connector 11, and the collimated light outputted from the output collimator 12 is used for processing and measurement. CW light may be fed into the input connector 11.

FIG. 3 is a table listing properties of the above-mentioned YbDFs 41 to 43 as samples of amplification optical fibers included in the optically active device 1 according to the first embodiment. The YbDF 41 has an unsaturated absorption peak of 250 dB/m, a core diameter of 2.4 μm, and a cladding diameter of 125 μm. The YbDF 42 has an unsaturated absorption peak of 180 dB/m, a core diameter of 4.0 μm, and a cladding diameter of 125 μm. The YbDF 43 has a double cladding structure with an unsaturated absorption peak of 9 dB/m, a core diameter of 15.0 μm, and a cladding diameter (inner cladding diameter) of 125 μm. Only the YbDF 43 has a low unsaturated absorption peak, since it assumes cladding pumping instead of core pumping. The cladding diameter in the YbDF 43 indicates the inner cladding diameter. In the YbDF 43, a coating (outer cladding 43$b$2) having a lower refractive index is provided on the outside of the inner cladding 43$b$1, so as to enable cladding pumping. The full width at half maximum of the bandpass filter 50 is 3 nm.

Figure 4:
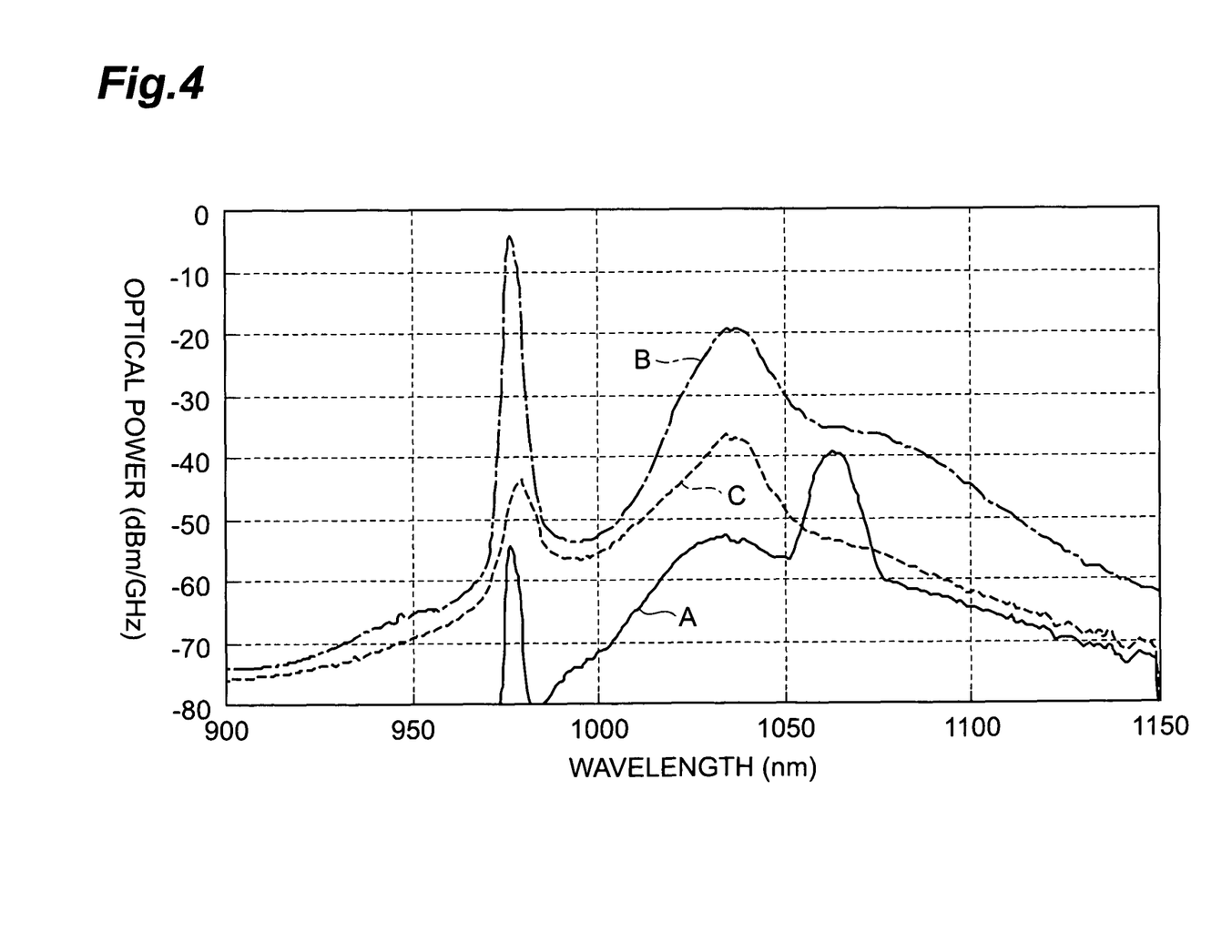
FIG. 4 is a graph showing the wavelength dependency of ASE light power in each part of the optically active device according to the first embodiment.

FIG. 4 is a graph showing the wavelength dependency of ASE light power in each part of the optically active device 1 according to the first embodiment. Here, a case where no optical coupler 33 as the deterioration preventing structure is provided will be explained. In FIG. 4, curve A indicates the power spectrum of forward ASE light at the input end of the YbDF 43, curve B indicates the power spectrum of backward ASE light at the input end of the YbDF 43, and curve C indicates the power spectrum of backward ASE light at the input end of the YbDF 42.

Figure 5A:
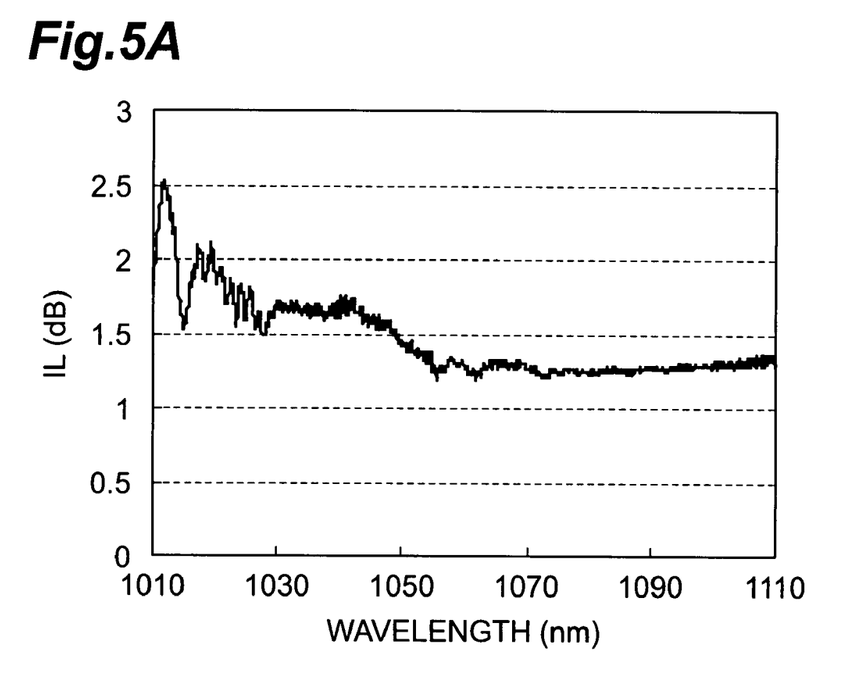
FIGS. 5A and 5B are transmission loss spectra of an optical isolator.
Figure 5B:
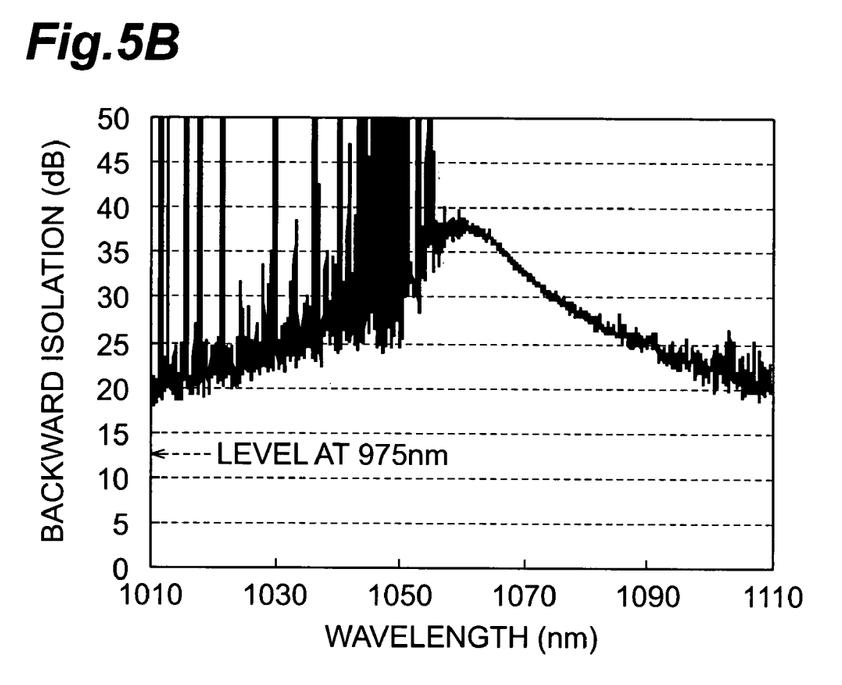

When the average input power to the input connector 11 is −5 dBm, ASE light having the power spectra indicated by the curves A, B in FIG. 4 is seen at the input end of the YbDF 43. The backward ASE light (curve B in FIG. 4) at the input end of the YbDF 43 exhibits a time-averaged total power as high as about 300 mW and also has a peak near a wavelength of 975 nm. The isolator 23 is supposed to prevent the backward ASE light from being incident on the front-stage pumping light source 71. However, as shown in FIGS. 5A and 5B, an isolator having a backward isolation peak at a wavelength of light to be amplified (in the band of 1064 nm) shows only a backward isolation of less than 20 dB at a pumping light wavelength (in the band of 975 nm). In FIG. 5B, acute backward isolation striae in the wavelength region shorter than 1064 nm seem to be noises due to the stability of the light source which do not exist in the actual isolator.

As a result, as shown in FIG. 4, the backward ASE light (curve C in FIG. 4) at the input end of the YbDF 42 has a spectrum widened to the vicinity of 975 nm as well. The backward ASE light component in this wavelength region (near 975 nm) reaches the front-stage pumping light source 71 through the optical couplers 32, 34. The average total power of the backward ASE component is about 1 mW, which is not problematic in general but yields temporal fluctuations in the case of pulse oscillation and the like. Further, there is a possibility of an instantaneously large power being injected into the front-stage pumping light source 71 in the case where an influence of self-pulsation or the like within the YbDF exists or in a transitional phase at the time of turning on the power or the like. As a result, there is a possibility of causing deteriorations in performances of the front-stage pumping light source 71 such as destruction thereof.

Therefore, in the first embodiment, the optical coupler 33 is provided between the optical isolator 23 and combiner 60 in order to prevent the deteriorations in performances of the front-stage pumping light source 71 such as destruction from occurring. Among the pigtails of the optical coupler 33, one (third port 33$a$) connected to none of the optical isolator 23 and combiner 60 preferably has a reflection preventing structure 33$c$. This reflection preventing structure 33$c$ may be a structure in which the leading end of the third port 33$a$ is terminated without reflection by fusion with a coreless fiber, a structure in which the leading end is sufficiently distanced from a shiny metal or the like so as not to generate diffuse reflection and the like, or a structure having a heat-dissipating mechanism.

Figure 6:
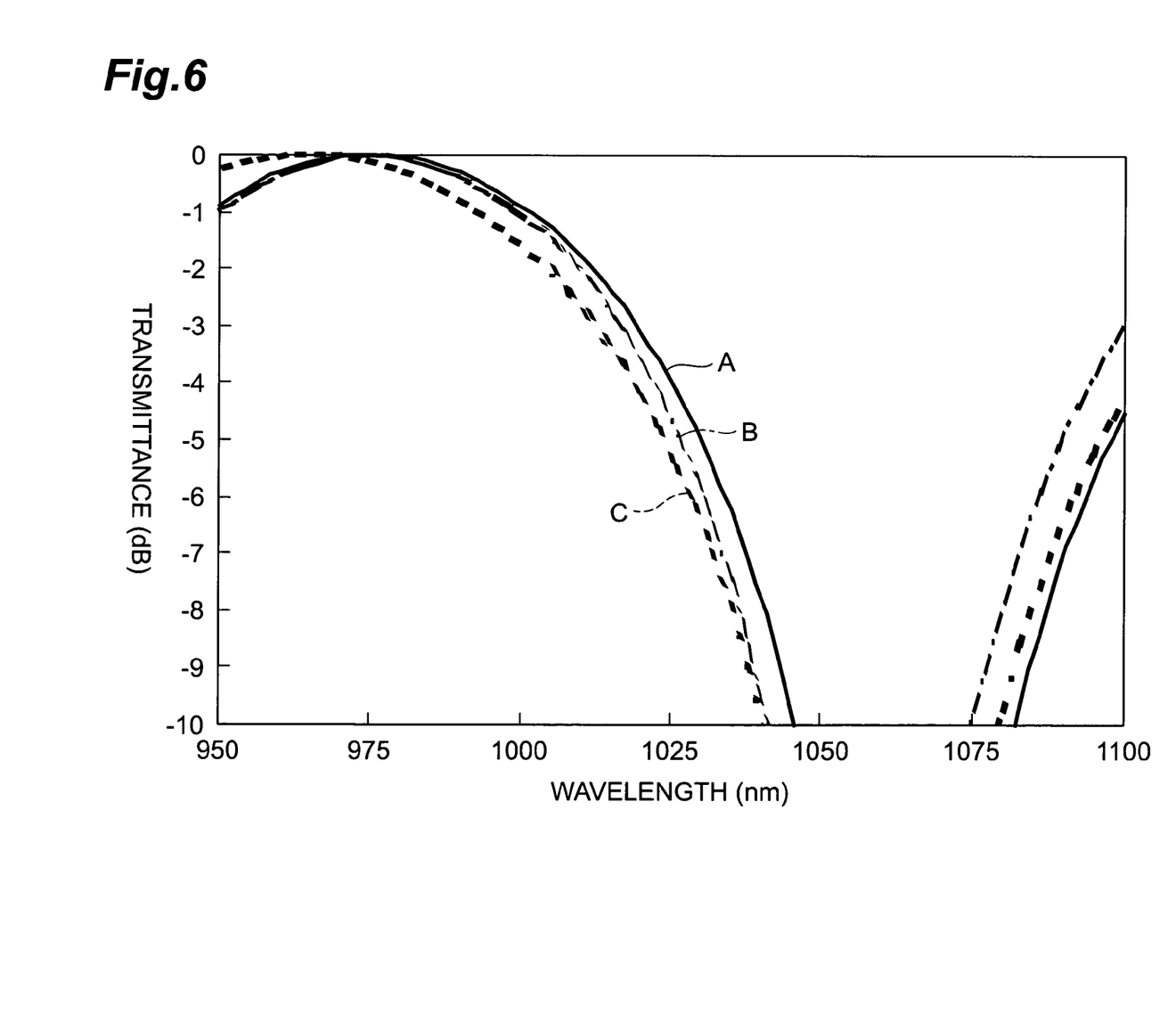
FIG. 6 is a transmission spectrum of an optical coupler (preventing means) included in the optically active device according to the first embodiment.

Preferably, the optical coupler 33 has a transmission characteristic substantially equal to that of the optical coupler 32 at the pumping light wavelength of the front-stage pumping light source 71. FIG. 6 is a graph showing examples of transmission characteristics of the optical coupler 33 included in the optically active device 1 according to the first embodiment. In FIG. 6, curve A indicates the transmission characteristic of the optical coupler 32, curve B indicates a bad example of the transmission characteristic of the optical coupler 33, and curve C indicates another bad example of the transmission characteristic of the optical coupler 33. When the transmission characteristic of the optical coupler 33 deviates from that of the optical coupler 32 as shown in FIG. 6, the ASE component centered at a wavelength of 975 nm is not completely eliminated by the optical coupler 33 but reaches the front-stage pumping light source 71 through the optical coupler 32. Therefore, the optical coupler 33 is desired to have a transmission characteristic substantially equal to that of the optical coupler 32.

Second Embodiment

Figure 7:
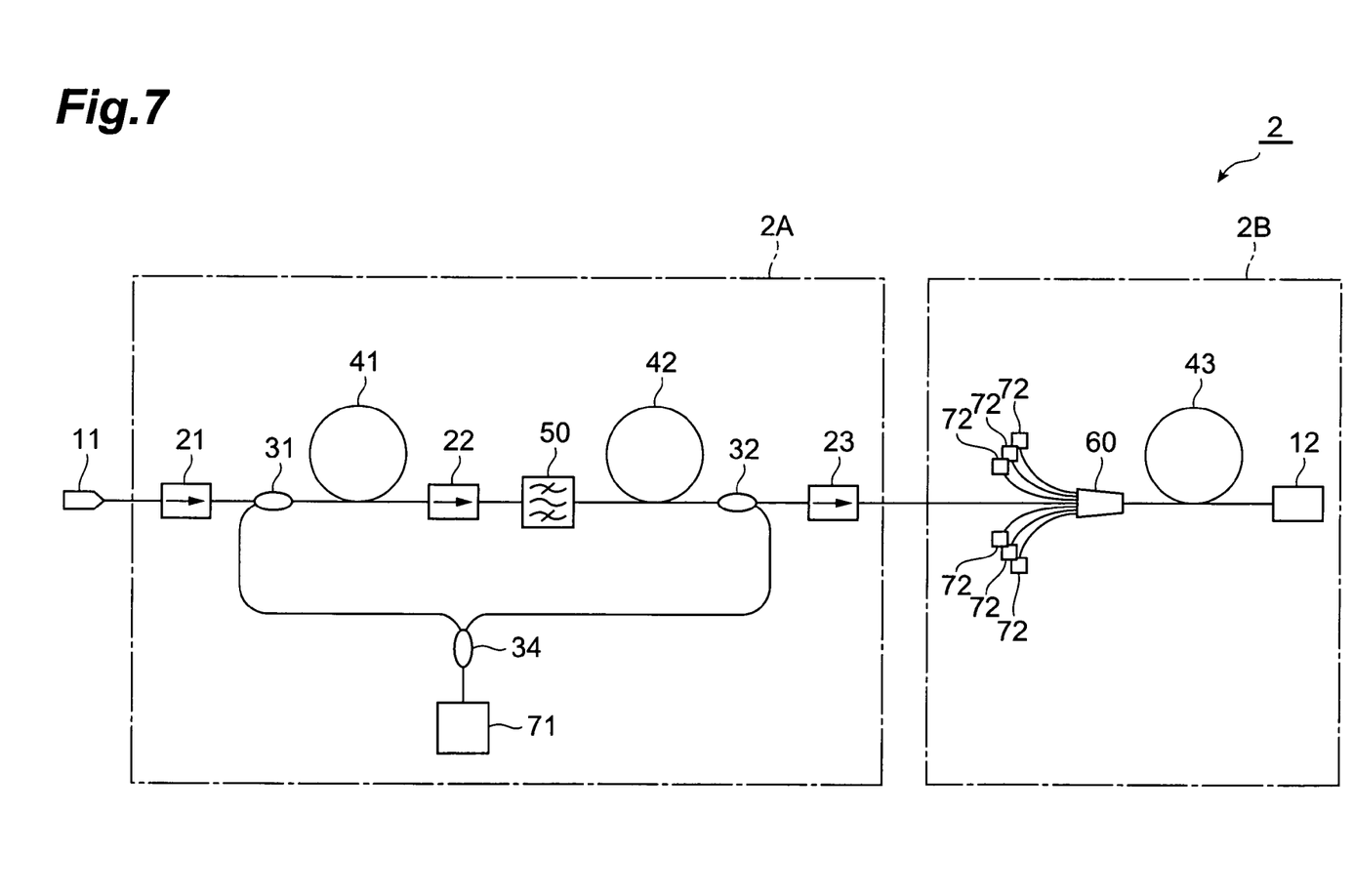
FIG. 7 is a view showing the structure of a second embodiment of the optically active device according to the present invention.

A second embodiment of the optically active device according to the present invention will now be explained. FIG. 7 is a view showing the structure of the second embodiment of the optically active device according to the present invention. The optically active device 2 according to the second embodiment is also an optical amplifier which amplifies light inputted from an input connector 11 and outputs thus amplified light as collimated light from an output collimator 12. As with the optically active device 1 according to the first embodiment, the optically active device 2 comprises a front-stage optical amplifying section 2A and a rear-stage optical amplifying section 2B which are arranged successively from the input connector 11 to the output collimator 12. The front-stage optical amplifying section 2A includes an optical isolator 21, an optical coupler 31, a YbDF 41, an optical isolator 22, a bandpass filter 50, a YbDF 42, an optical coupler 32, and an optical isolator 23 which are successively arranged along a propagating direction of input light, while the rear-stage optical amplifying section 2B comprises a combiner 60 and a YbDF 43. The front-stage optical amplifying section 2A includes an optical coupler 34 and a front-stage pumping light source 71 which are optically connected to the optical couplers 31, 32. The rear-stage optical amplifying section 2B includes a plurality of rear-stage pumping light sources 72 optically connected to the combiner 60.

The optically active device 2 according to the second embodiment shown in FIG. 7 differs from the optically active device 1 according to the first embodiment shown in FIG. 1 in that pumping light is supplied backward from the optical coupler 32 disposed downstream of the YbDF 42 to the YbDF 42 and that no optical coupler 33 is provided.

The optically active device 2 according to the second embodiment operates as follows. The pumping light (in the wavelength band of 975 nm) outputted from the front-stage pumping light source 71 is divided into two, which are outputted from the optical coupler 34 to the optical couplers 31, 32, respectively. The pumping light inputted to the optical coupler 31 is supplied forward to the YbDF 41. The pumping light inputted to the optical coupler 32 is supplied backward to the YbDF 42. The pumping light (in the wavelength band of 915 nm) outputted from the plurality of rear-stage pumping light sources 72 is supplied forward to the YbDF 43 through the combiner 60.

The light to be amplified inputted from the input connector 11 is fed into the YbDF 41 through the optical isolator 21 and optical coupler 31, and is amplified in the YbDF 41. The first-order amplified light outputted from the YbDF 41 is fed into the YbDF 42 through the optical isolator 22, bandpass filter 50, and optical coupler 32, and is amplified in the YbDF 42 as well. The second-order amplified light outputted from the YbDF 42 is fed into the YbDF 43 through the optical isolator 23 and combiner 60, and is further amplified in the YbDF 43. The final amplified light outputted from the YbDF 43 is outputted as collimated light by the output collimator 12 to the outside of the optically active device 2.

Thus, the second embodiment has a structure for backward-pumping the YbDF 42 without providing the optical coupler 33 of the first embodiment. Because of this structure, the backward ASE component in the pumping wavelength region from the YbDF 43 and output components such as self-pulsation are transmitted through the optical coupler 32 and made incident on the YbDF 42 without being incident on the optical coupler 34 from the optical coupler 32.

In the structure mentioned above, however, a commercially available 0.98-μm-band-pumping LD yields a reflectance of about 10 dB when seen from the optical coupler 34. Therefore, the parts of YbDF 41 and 42 resonate by themselves, whereby the structure fails to function as an optical fiber amplifier. Such a problem does not occur in a structure using a pumping LD module with a low reflectance or inserting a 0.98-μm-band isolator immediately downstream of the front-stage pumping light source 71 as a matter of course.

Other Embodiments

Without being restricted to the embodiments mentioned above, the present invention can be modified in various ways. For example, YbDF is represented as an optical amplification medium in the above-mentioned first and second embodiments. However, the optically active device according to the present invention can also be employed in the case of 1.53-μm-band pumping using an Er-doped optical fiber (EDF).

The deterioration preventing structure for preventing unnecessary ASE components from being incident on the front-stage pumping light source 71 may be a long-period fiber grating having a loss peak in the band of 0.98 μm while being able to eliminate light having the same wavelength as that of the pumping light of the front-stage pumping light source 71 by coupling to a cladding mode, and yielding a low loss at the wavelength of light to be amplified instead of the molten WDM fiber coupler. In any case, a fiber-type device is desirable from the viewpoint of suppressing the insertion loss and preventing the device itself from being optically damaged. A coupler of dielectric multilayer film filter type is also employable as the molten WDM fiber coupler.

As in the foregoing, in the structure of amplifying input light in a plurality of stages in a propagating path thereof, the optically active device according to the present invention can effectively prevent deteriorations in performances such as destruction of a pumping light source on the upstream side from being caused by the backward propagation of ASE light generated on the downstream side.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical active device having a plurality of optical amplifying sections cascaded on a path for propagating input light with a predetermined wavelength, said optically active device comprising:

a front-stage optical amplifying section, positioned on the upstream side as seen in a propagating direction of input light in optical amplifying sections adjacent to each other selected from said plurality of optical amplifying sections, said front-stage optical amplifying section including, at least, a front-stage amplification optical fiber doped with ytterbium as an optically active material, and a front-stage pumping light source for supplying said front-stage amplification optical fiber with pumping light for pumping ytterbium by way of a multiplexer, the pumping light containing at least a wavelength component in a band of 0.98 μm;

a rear-stage optical amplifying section, positioned on the downstream side as seen in the propagating direction of input light in said selected optical amplifying sections adjacent to each other; said rear-stage optical amplifying section including, at least, a rear-stage amplification optical fiber doped with ytterbium as an optically active material, and a rear-stage pumping light source for supplying said rear-stage amplification optical fiber with pumping light for pumping ytterbium by way of a multiplexer;

an optical isolator provided between said front-stage amplification optical fiber and said rear-stage amplification optical fiber, said optical isolator blocking backward light having the same wavelength as light to be amplified and passing through part of light in the band of 0.98 μm; and a deterioration preventing structure configured, without including said optical isolator, so as to prevent said front-stage pumping light source in said front-stage optical amplifying section from deteriorating a performance, wherein said deterioration preventing structure including one of a structure such that, in backward ASE light generated in said rear-stage amplification optical fiber and directed from said rear-stage optical amplifying section to said front-stage optical amplifying section, part of a backward ASE component in the band of 0.98 μm is not directly incident on said front-stage pumping light source by way of the multiplexer in said front-stage optical amplifying section, and a structure attenuating a power of the part of the backward ASE component in the band of 0.98 μm until falling below a level that does not influence the performance deterioration of said front-stage pumping light source before the part of the backward ASE light is incident on said multiplexer in said front-stage optical amplifying section.

2. An optical active device according to claim 1, wherein said front-stage amplification optical fiber includes at least two amplification optical fiber elements cascaded on the path for propagating the input light.

3. An optical device according to claim 1, wherein said deterioration preventing structure includes a wavelength-multiplexing fiber coupler of a wavelength division type arranged between said front-stage optical amplifying section and said rear-stage optical amplifying section, said wavelength-multiplexing fiber coupler having, at least, a first port optically connected to a light entrance end of said rear-stage optical amplifying section, a second port optically connected to a light exit end of said front-stage optical amplifying section and adapted to transmit therethrough the part of a backward ASE component excluding the band of 0.98 μm from the backward ASE light inputted through said first port, and a third port for selectively outputting the part of the backward ASE component in the band of 0.98 μm from the backward ASE light inputted through said first port.

4. An optical device according to claim 3, wherein an end part of said third port in said wavelength-multiplexing fiber coupler is terminated without reflection while having a heat-dissipating mechanism.

5. An optical device according to claim 1, wherein said rear-stage amplification optical fiber in said rear-stage optical amplifying section has a double cladding structure, the pumping light from said rear-stage pumping light source being supplied to a cladding region having the double cladding structure, and
    wherein said rear-stage pumping light source in said rear-stage optical amplifying section supplies said rear-stage amplification optical fiber with pumping light in a single transverse mode.

6. An optical device according to claim 1, wherein said deterioration preventing structure provides at least the part of the backward ASE component in the band of 0.98 μm in the backward ASE light with a transmission loss equal to or lower than that of a structure for coupling the pumping light outputted from said front-stage pumping light source in said front-stage optical amplifying section with said front-stage amplification optical fiber.

* * * * *